Feb. 14, 1939.　　　　　M. HOKANSON　　　　　2,147,343
FRICTION JOINT
Filed Nov. 5, 1937　　　　2 Sheets-Sheet 1

INVENTOR.
Martin Hokanson.
BY Geo Stevens
ATTORNEY.

Feb. 14, 1939.   M. HOKANSON   2,147,343
FRICTION JOINT
Filed Nov. 5, 1937   2 Sheets-Sheet 2
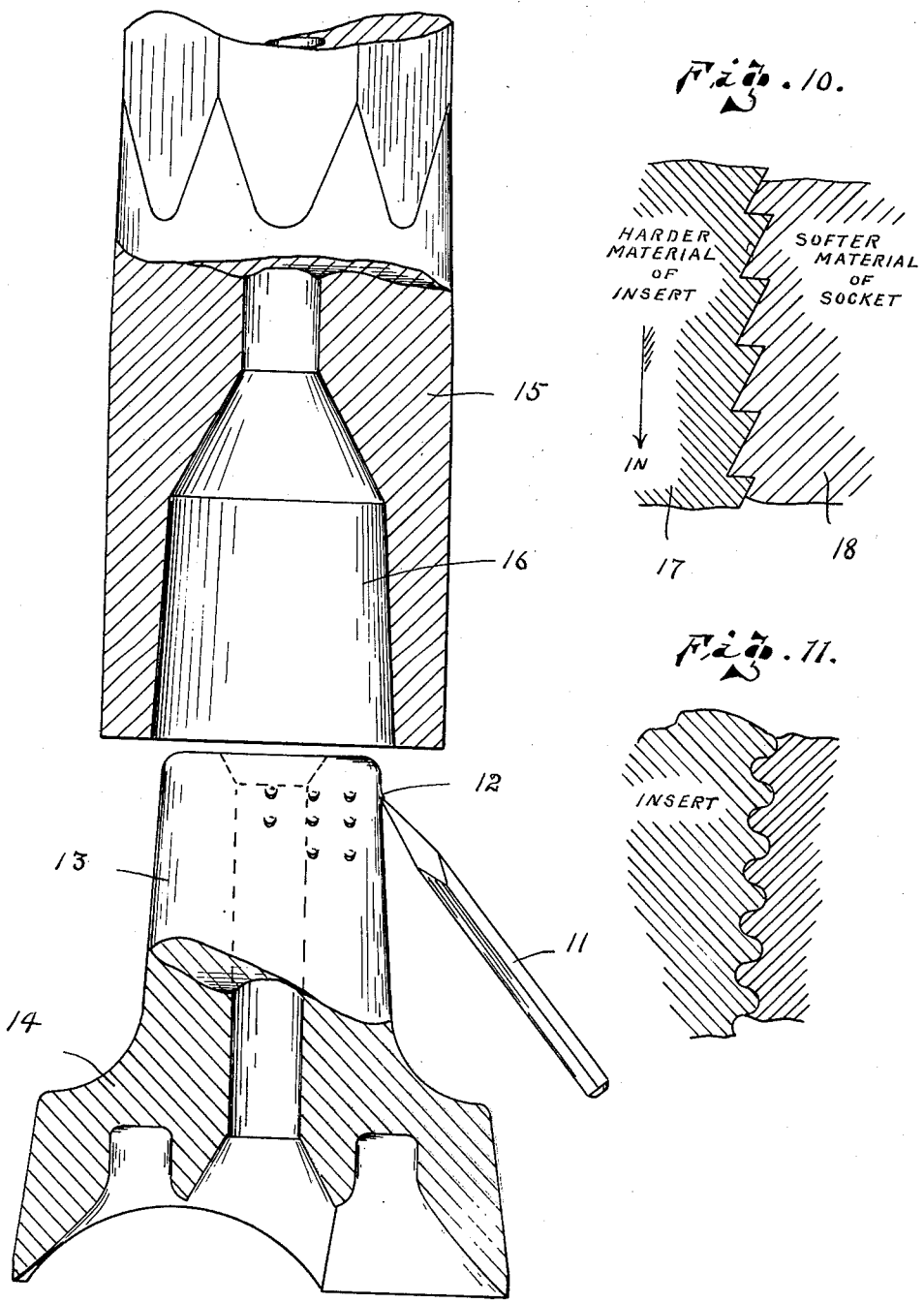

Patented Feb. 14, 1939

2,147,343

UNITED STATES PATENT OFFICE 2,147,343

FRICTION JOINT

Martin Hokansom, Duluth, Minn., assignor to Eidco, Inc., Duluth, Minn., a corporation of Minnesota Application November 5, 1937, Serial No. 173,005

8 Claims. (Cl. 255—64)

This invention relates to friction joints, and to such as are especially applicable to that type of joint for example as illustrated in my copending applications, Serial Numbers 127,958 and 145,726, wherein a drill rod is attached as by such a joint to the cutting drill head, and wherein either the head or the rod is provided with a socket for the reception of the end of the other, or the parts of a separable drill head are united in such a manner.

The principal object of the instant invention resides in a simple expedient whereby to improve the frictional contact of such a joint by knurling, serrating, or otherwise roughening of either or both of the friction surfaces of the cooperative parts thereof.

Another object is to provide such means as will automatically increase its function during the normal rotation of the drill.

Still another object of the invention is to so design the teeth of the roughened surface as to more readily resist separation of the joint, even if the union of the parts is but slight.

Other objects and advantages of the invention will appear in the following description thereof.

Referring now to the accompanying drawings, forming part of this application, and wherein like reference characters indicate like parts:

Figures 6, 7, 8, 10 and 11 are greatly enlarged sectional views of modified forms of serrations, which could be used in the employment of the invention.

Figure 9 is a combined elevation and sectional view of a rod and drill head assembly wherein the shank of the drill head is designed to fit within a socket in the end of the rod, and illustrating a still further modified form of roughening the otherwise frictionally engaged surfaces.

From the nature of the invention it is quite apparent that the type of serrations or roughening used to improve the holding properties of the joint could only be determined by experience with the character of the material of which the drill rod and head are formed, together with the type of work being accomplished. However, it is well known that in the type of drilling to which this invention is especially applicable, to wit, pneumatic drilling, the blows are exceedingly rapid and forceful, and the necessity of the union of these parts being dependable is of paramount importance.

It will also be appreciated that in respect to such a union where the rod is applied within a socket within the head, or vice versa, during the first few blows of any drilling operation, the complete union of the parts is substantially accomplished, this being true in respect to either a plain frictional joint, or in applicant's improved joint. However, in the latter, the liability of the friction surfaces being jarred loose of their union by the subsequent action of the drill, is practically eliminated. For example, when the union of the parts is complete, and if the successive blows on the rod by the drill piston is causing the bit and the reamer to penetrate into the rock, a proportionate amount of work is absorbed in the bottom of the hole being drilled. If not all of the work is being absorbed in the bottom of the hole drilled, as, for instance, in case the rock is extremely hard, the surplus work is consumed in the rebound of the bit and the rod. If the force of the rebound is greater than the frictional force between the friction surfaces of the rod and bit head socket and the bit and bit socket, the rod and the bit will become loose, and this is a decided drawback to a friction joint.

Figure 1:
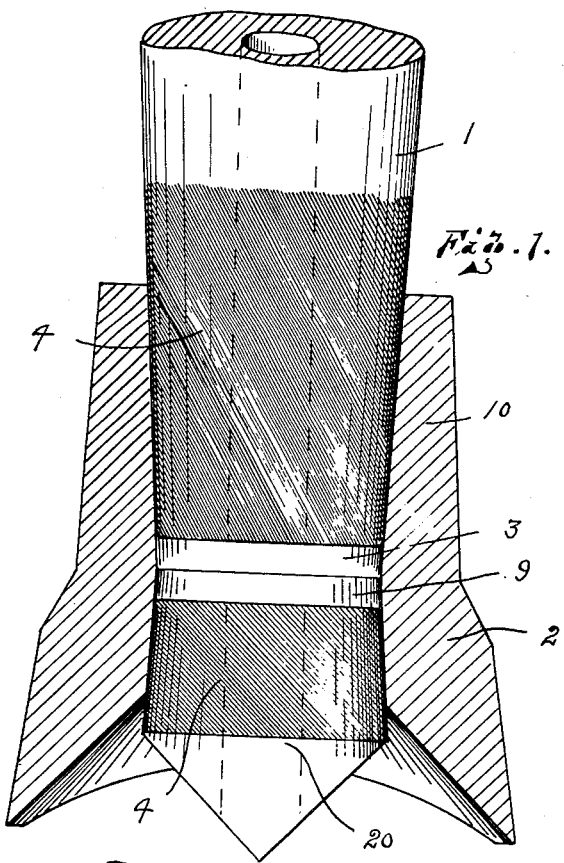

In Figure 1 of the drawings, I represents the tapered end of a drill rod, and 2 represents the cutting head of the drill, the latter being provided with a tapered socket 3, forming the skirt 10 for the reception of the tapered end of the rod. This type of cutting head is also provided with an axial tapered socket 9 in which is frictionally installed the principal cutter of the bit as at 20, the remainder of the cutting head forming the reaming portion of the bit. It is obvious that the smaller the angles of these tapered surfaces the greater the friction between said surfaces. It is obvious too that the strength of the socket or skirt must be able to withstand the force of the blows upon the rod and that the smaller the angles of the tapered surfaces the strength of the skirt must be increased proportionately by increasing its thickness, or, if the pressure between the tapered surfaces is uniform, the length of the socket can be increased with the same effect. An extremely small amount of movement between the friction surfaces longitudinally changes the pressure between the friction surfaces instantly from maximum to minimum, or vice versa, but this is not the case with the possible turning of the rod in the socket, which remains constant as long as the rod does not move longitudinally in the socket.

It is therefore readily understood that the matter of utmost importance in a friction joint is to prevent movement longitudinally between the friction surfaces.

In Figure 1 the knurled, or serrated surface of the tapered portion or portions is indicated at 4, and shown as spirally about the tapered end of the rod, or at an angle transverse the axis thereof to increase the resistance against longitudinal as well as rotary movement between the tapered surfaces; it being assumed that the bit rotates counter-clockwise during the drilling operation.

The rod is made from drill steel, and the end of the rod is machined and roughened while the steel is in the annealed state. After finishing, the rod end is hardened to maximum hardness, approximating that of a file.

The bit is also hardened of course to produce the proper hardness for its cutting surfaces, the outside of the rod socket being hardened in order to produce maximum strength but the inside of the socket may be left relatively softer so that when the rod end is driven into the socket, the serrated surface of the rod end will cut a similar surface on the inside of the socket, or in other words embed itself in the surface of the socket, and result in a firm union of the parts extremely resistant to longitudinal or rotary movement of the parts.

Figure 2:
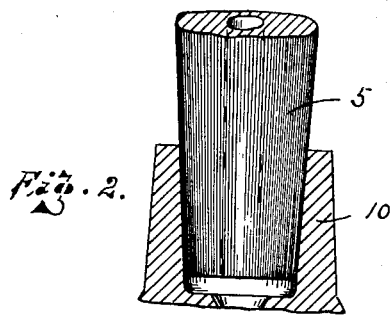
Figures 1, 2, 3, 4 and 5 are combined elevation and sectional views of a drill head and rod joint, the rod being shown in elevation and the head portion in section.

In Figure 2 the serrations are shown at 5 as being vertically disposed, or parallel with the axis of the rod, and this form, obviously, presents a surface having the greatest resistance to rotary movement of the parts.

Figure 3:
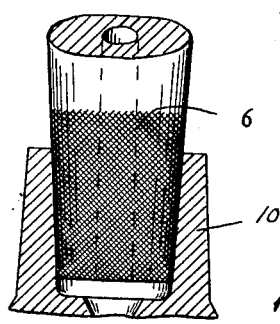

In Figure 3 the serrations are more in the form of knurling, or the surface is roughened by opposed diagonally disposed grooves such as illustrated at 6, this form having great resistance to both rotary and longitudinal movement of the parts, in either direction of rotation.

Figure 4:
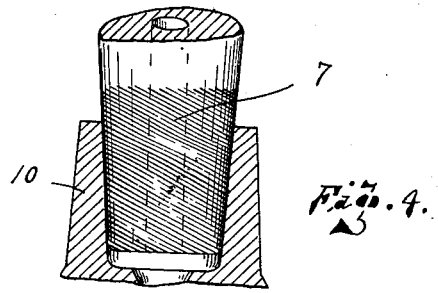
Figure 5:
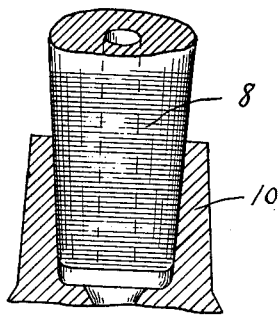

In Figure 4 the serrations are shown at 7 and as being in but one direction, but of a lesser pitch than those shown in Figures 1 and 3; whereas in Figure 5 they are shown at right angles to the axis as at 8 and these forms illustrate surfaces having greater and the greatest resistance to a longitudinal separation of the parts.

Figures 6, 7, 8:
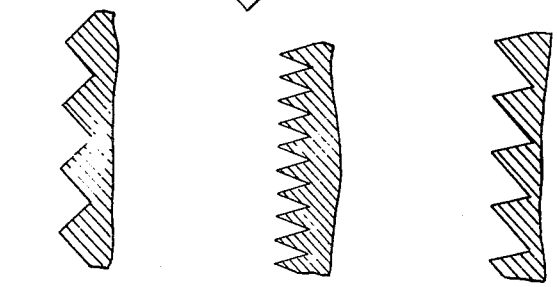

Figures 6, 7, and 8 illustrate different forms or shapes of grooves that can be used for different types of work to be accomplished in the drilling operation, or as the different materials of which the tools may be made may require.

And it may be found, as before stated, in some classes of work that it would prove expedient to have the tapered portion of that part which enters the other, or in other words the male member, of the union, harder than the female member so that when forced together the serrated portion of the male member will embed itself within the surface of the female member either spirally or in whatever manner the roughened portion is formed so that in any event the union of the two parts thus forced together is materially improved and less liable to separation by the vibration of the work being performed.

In Figure 9 is illustrated a modified form of roughened surface, such as may be accomplished for example by a cape or like chisel, indicated at 11, and by which individual burr like protrusions may be formed as shown at 12 upon the shank 13 of the bit 14, the rod for such a bit being illustrated at 15 and having a similarly tapered socket 16 therein for reception of the shank of the bit after being thus roughened, and it is quite obvious that even a cold chisel or center punch might be used in roughening this surface, though the individual burrs might be of a little different form.

In Figure 10 is illustrated, greatly enlarged, a still further modification of the comparatively very small tooth-like serrations formed on the harder male portion 17 of the joint, and the effect of same when forced, in the direction of the arrow, into a female member 18 of softer material, wherein it is apparent that, though relatively quite small, a considerable portion of the softer material is forced into the space intermediate of the toothed portions, and which material would have to be dislodged or sheared off if the parts were separated by a straight longitudinal force. The slope of the two surfaces forming the V-shape of the tooth-like serrations may be referred to as the rake and clearance angles of the serrations. In Figures 6 and 7 these are identical, but in Figures 8 and 10 the rake angle is at a greater degree of inclination to the axis of the bit than the clearance angle, so that in these latter views the clearance angle, as is more apparent in Figure 10, facilitates the insertion of the male member, whereas the rake angle retards the separation of said members longitudinally. However if these tooth like serrations were of spiral form on the inserted member, it is obvious that the members may be comparatively readily separated by an unscrewing motion. The above is also applicable to Figure 11 in which the teeth are of a still further modified form which may prove desirable in some instances, and, if desired, unroughened areas, as shown in Figure 9 of the drawings, intermediate of the protrusions 12, may be left intermediate of the protrusions formed by the thread-like serrations as previously described.

Having thus described my invention, what I claim and desire to secure by Letters Patent, is:

1. A tapered friction joint for the separable union of a rock drill bit to a drill rod comprising a male member and a female member, the surface of the male member having formed thereon a series of serrations and hardened to a greater degree than that of the female member, whereby when forcibly united, the serrations of the male member will embed themselves within the surface of the female member and form a substantially solid union of said members and thereby increase the frictional resistance of said joint.

2. A tapered friction joint for the separable union of a rock drill bit to a drill rod, wherein the end of the drill rod is tapered to fit a tapered socket in the drill bit, characterized by the tapered end of the drill rod having formed thereon a series of V-shaped spirally disposed knurls which embed themselves within the surface of the socket in the drill bit when in use and thereby increase the frictional resistance of said joint.

3. A friction joint for the separable union of a rock drill bit to a drill rod, comprising a hardened tapered male member fitting into a correspondingly tapered softer socket in a female member, characterized by the tapered male member having formed thereon a series of spirally disposed serrations the clearance angle of which is such as to facilitate the union of said members and embed themselves within the surface of the socket and increase the resistance to the separation of said members.

4. In a two-part drill bit having means for the removable attachment thereof to the end of a drill rod and a removable cutter in the working face of said bit, a friction joint for the separable union of said cutter to said bit, comprising a hardened tapered shank being formed on said cutter and adapted to fit within a correspondingly tapered softer socket in said bit, and a series of spiral serrations upon said tapered shank which embed themselves within the surface of said socket when forced therein to increase the frictional resistance to the separation of said cutter from said bit.

5. A tapered joint for the separable union of pneumatic drilling members wherein the end of one of said members is tapered to fit a tapered socket in the other of said members, characterized by the tapered end of the male member being materially harder than that of the similarly tapered socket of the other member and having formed thereupon a series of V-shaped spirally disposed threads which embed themselves within the surface of the socket in the female member when the two members are forced together.

6. A friction joint for the separable union of a rock drill bit to a drill rod, comprising a hardened tapered male member fitting into a correspondingly tapered softer socket in a female member, characterized by the tapered male member having formed thereon a series of spirally disposed serrations which embed themselves within the surface of the female socket member, and the clearance angle of which serrations is such as to facilitate the union of said members and the rake angle of which is such as to increase the resistance to the separation of said members.

7. A tapered friction joint for the separable union of a rock drill bit to a drill rod, wherein the end of the drill rod is tapered to fit a tapered socket in the drill bit, characterized by the tapered end of the drill rod having formed thereon a series of spirally disposed serrations adapted to embed themselves within the surface of the socket in the drill bit when in use and thereby increase the frictional resistance of said joint.

8. A tapered joint for the separable union of pneumatic drilling members wherein the end of one of said members is tapered to fit a tapered socket in the other of said members, characterized by the tapered end of the male member being materially harder than that of the similarly tapered socket of the other member and having formed thereupon a series of spirally disposed serrations adapted to embed themselves within the surface of the socket in the female member when the two members are forced together.

MARTIN HOKANSON.